United States Patent

Usami et al.

[11] Patent Number: 5,805,327
[45] Date of Patent: Sep. 8, 1998

[54] RESHAPING DEVICE FOR OPTICAL SHORT PULSES

[75] Inventors: Masashi Usami, Yono; Yuichi Matsushima, Tokorozawa; Munefumi Tsurusawa, Kodaira, all of Japan

[73] Assignee: Kokusai Denshin Denwa Kabushiki Kaisha, Tokyo, Japan

[21] Appl. No.: 653,662

[22] Filed: May 21, 1996

[30] Foreign Application Priority Data

May 24, 1995 [JP] Japan .................................. 7-148382
Feb. 7, 1996 [JP] Japan .................................. 8-044074

[51] Int. Cl.$^6$ ................................ H01S 3/19; H01S 3/10
[52] U.S. Cl. ........................ 359/244; 359/252; 359/299
[58] Field of Search ................................ 359/241, 244, 359/252, 255, 299

[56] References Cited

U.S. PATENT DOCUMENTS 4,209,690  6/1980  Rentzepis .................................. 359/244
5,175,739  12/1992  Takeuchi et al. ........................ 372/45

FOREIGN PATENT DOCUMENTS 5045692  2/1993  Japan .

OTHER PUBLICATIONS

Klann et al, Jour. Appl. Phys., vol. 77, #1, pp. 277–286, Jan., 1995; abstract only herewith.
Abakumov et al, for. Jour. Quant. Elec., vol. 7, #10, pp. 1308–1310, Oct., 1997; abst. only herewith.

*Primary Examiner*—Nelson Moskowitz
*Attorney, Agent, or Firm*—Lackenbach Siegel Marzullo Aronson & Greenspan, P.C.

[57] ABSTRACT

There is disclosed a reshaping device for optical short pulses to effectively perform reshaping of and eliminate noise from an optical short pulse of a pulse width of pico second order less than a carrier life time. Input optical short pulses are applied to a saturable absorption element, while an assist light of a wavelength longer than that of the input optical signal pulses is also applied to the saturable absorption element to accelerate, by stimulated emission, recombination of excited electrons and holes produced in the saturable absorption element in response to the input optical signal pulses, so that the input optical signal pulses reshaped are derived from the saturable absorption element.

9 Claims, 10 Drawing Sheets

Fig.(3A)
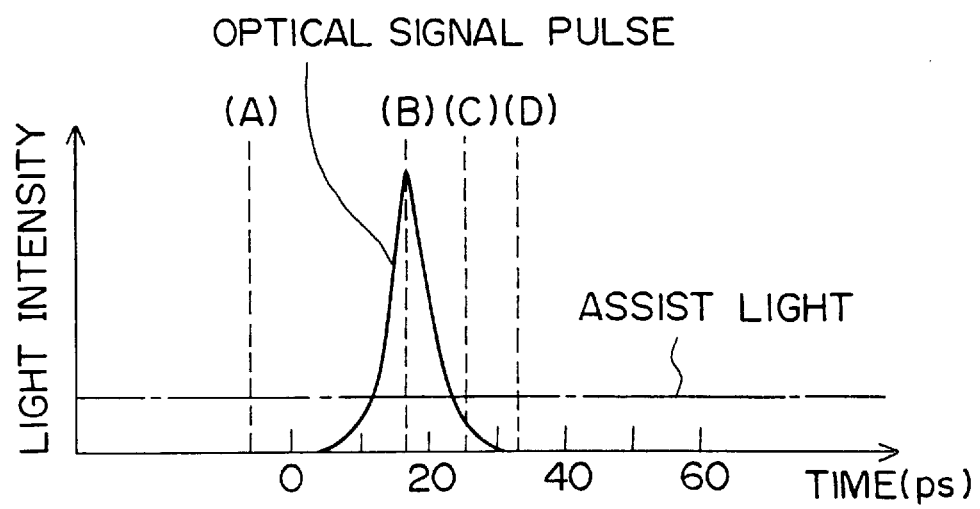
Fig.(3B)
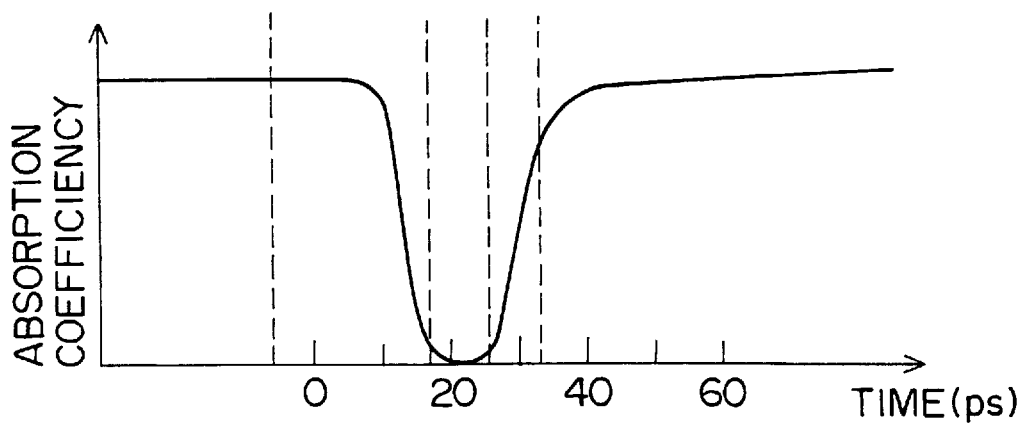

Fig. 9(A)
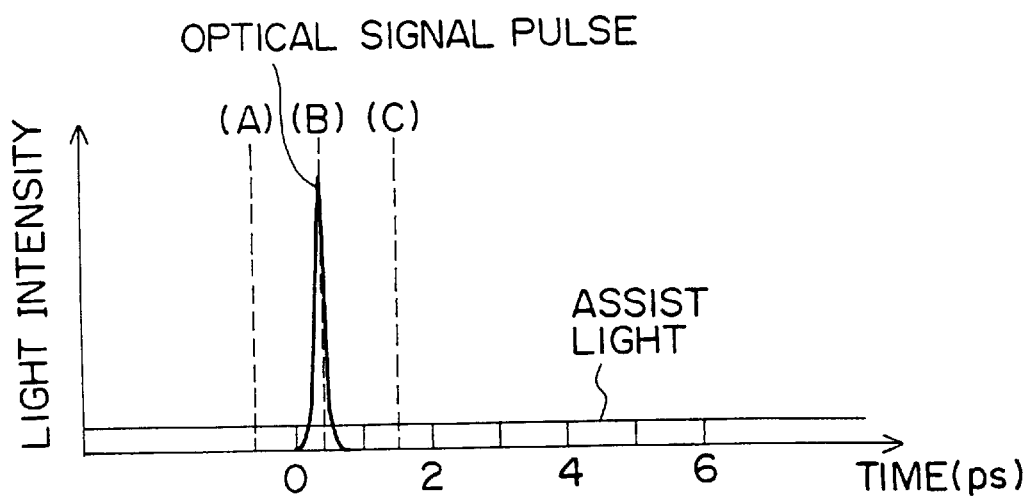
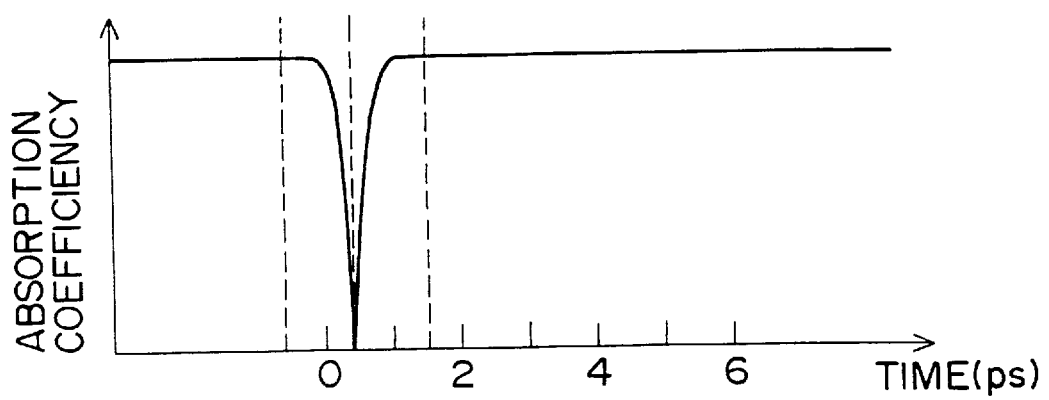
Fig. 9(B)

RESHAPING DEVICE FOR OPTICAL SHORT PULSES

BACKGROUND OF THE INVENTION

The present invention relates to a device for reshaping of and eliminating noise from optical short pulses used in optical transmission systems, optical switching systems, etc.

Saturable absorption elements utilizing an optical absorption saturation effect of semiconductor can be applied to reshaping and noise-elimination of optical short pulses. The optical absorption saturation effect of semiconductor is known as a property where an absorption coefficient of the semiconductor decreases non-linearly while a transmittance thereof increases non-linearly as an intensity of injected light increases in case of applying an optical input signal of energy near a band edge thereof. This absorption saturation effect is caused by a band filling effect in that electron-hole pairs produced by absorption raises a state occupation rate in a band to shift an absorption end to a high energy side. Accordingly, in a case where there is no optical pulse, weak noise is absorbed in the saturable absorption element while an injected optical pulse of an intensity higher than a threshold level is transmitted through the saturable absorption element. As a result of such an operation, the saturable absorption element can be applied to reshaping of and eliminating noise from optical short pulses. In a time chart of a transmittance of an optical short pulse in a semiconductor saturable absorption element, a sufficiently high speed response of pico second order can be seen at a rising leading edge of the optical short pulse when an absorption decreases in response to absorption of light. However, at a dropping trailing edge instant of the optical short pulse when an intensity of the injected optical pulse decreases, a recovery time necessary to recover an original absorption coefficient is a time of about a life time of a carrier (electron or hole). FIG. 11 illustrates schematically an above-mentioned operation, in which FIG. 11(a) illustrates a time chart of an intensity of an optical pulse, FIG. 11(b) a time chart of an absorption coefficient of a saturable absorption element. Accordingly, a saturable absorption element can not perform reshaping of and eliminating noise from an optical short pulse of a pulse width less than a carrier life time. Conventional approaches for shortening the carrier life time are, for example, a method for introducing impurities, defects, etc. into an absorption layer, a method for extracting carriers from a saturable absorption element by applying a reverse bias thereto, and a method for extracting from a saturable absorption element carriers produced in an absorption region by utilizing a tunnel effect. However, a high speed operation making possible to optical short pulses of pico second order is not proposed by this time.

As mentioned above, conventional saturable absorption elements have such a drawback that a time necessary to recover an original absorptance is limited by a carrier life time. Accordingly, these saturable absorption elements have such a defect that they can not perform reshaping of and eliminating noise from an optical short pulse of a pulse width less than a carrier life time.

SUMMARY OF THE INVENTION

An object of the present invention is to provide a reshaping device for optical short pulses capable of effectively performing reshaping of and eliminating noise from an optical short pulse of a pulse width of pico second order less than a carrier life time.

To attain the above object, a reshaping device for optical short pulses comprises: a saturable absorption element; first injection means for injecting first input optical signal pulses of optical short pulses to said saturable absorption element; second injection means for injecting, to said saturable absorption element, second input light of a wavelength longer than that of said first input optical signal pulses to accelerate, by stimulated emission, recombination of excited electrons and holes produced in said saturable absorption element in response to said first input optical signal pulses; and output means for outputting said first input optical signal pulses reshaped from said saturable absorption element.

In accordance with the present invention, an absorption recovery time of a saturable absorption element limited by a carrier life time is made to be shorter for effectively performing reshaping of and eliminating noise from an optical short pulse of a pulse width of pico second order less than a carrier life time.

BRIEF DESCRIPTION OF THE DRAWINGS

The present invention will be described in detal below with reference to accompanying drawings, in which:

FIG. 3 illustrates a time chart (a) of intensities of the input optical signal pulse and the assist light of continuous light wave injected to a saturable absorption element and a time chart (b) of an absorption coefficient thereof;

FIG. 9 illustrates waveform diagrams illustrating a time chart of an absorption coefficient in the embodiment shown in FIG. 8;

DETAILED DESCRIPTION

Figure 1A:
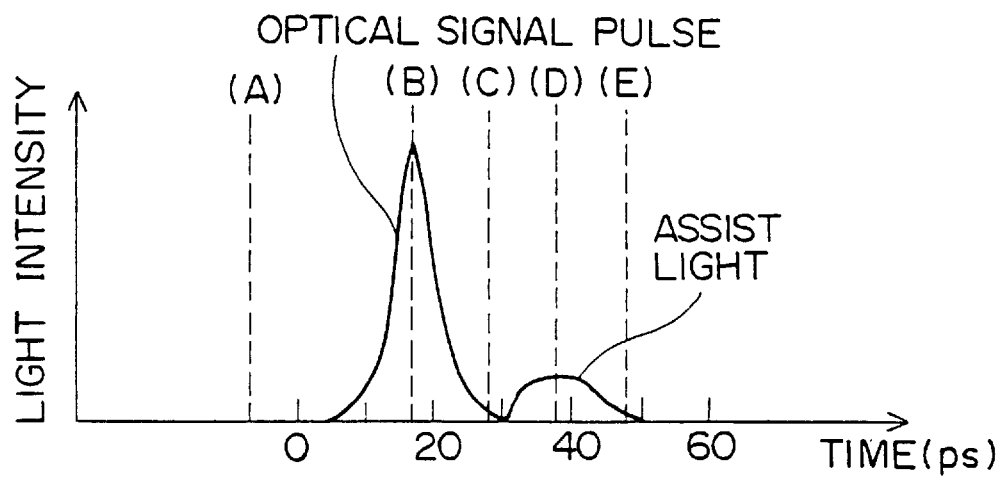
FIG. 1 illustrates a time chart (a) of the intensity of an input optical signal pulse and another input light (an assist light) of a wavelength longer than that of the input optical signal pulse injected to a saturable absorption element employed in the present invention, and a time chart (b) of an absorption coefficient of the saturable absorption element.
Figure 1B:
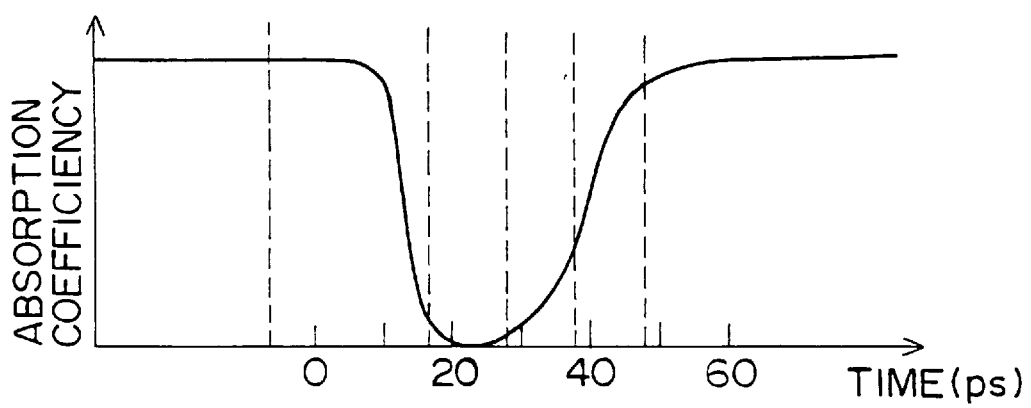

The principle of the present invention is now described in details. FIG. 1(A) illustrates schematically a time chart of an intensity of an input optical signal pulse and another input light (an assist optical signal) of a wavelength longer than that of the input optical signal pulse injected to a saturable absorption element employed in the present invention, FIG. 1(B) illustrates shematically a time chart of an absorption coefficient of the saturable absorption element.

In FIG. 2, energy distribution of an electron at a conduction band in an absorbing layer of a saturable absorption element, to which an input optical signal pulse and an assist light are injected, are schematically illustrated in a time series. In this case, FIGS. 2(A), 2(B), 2(C) and 2(D) show, respectively, at the time before injecting the input optical signal pulse, at the time just injecting the input optical signal pulse, at the time just after the decay or drop of the input optical signal pulse, and at the time just injecting the assist light. In a stationary condition before injecting the input optical signal pulse, the number of electrons is small at a conduction band in an absorption layer of the saturable absorption element [FIG. 2 (A)], and the saturable absorption element has a sufficient absorption coefficient [FIG. 1(B)–(A)]. Next, at the time of injecting the input optical signal pulse, the input optical signal pulse is absorbed in the absorption layer so that an electron density at an energy corresponding to the input optical signal pulse increases abruptly [FIG. 2(B)], while an absorption coefficient decreases abruptly [FIG. 1(A)–(B)]. This in called as "spectral hole barning", which is relaxed to a distribution of thermal equillibrium state within a time of 100 femto-second order as a result of an in-band transition as shown in FIG. 2(C). However, the carrier density of this time is maintained at the increased state in comparison with the carrier density before injecting the input optical signal pulse, while the absorption coefficient is also maintained at the decreased state. A carrier life time of several hundred pico-second order is necessary to relax the carrier density of the increased state to the stationary carrier density before injecting the input optical signal pulse. On the other hand, since the carrier density increases largely in comparison with the stationary state at the state of FIG. 2(C), a quasi-Fermi-level is raised up so that the saturable absorption element has a gain for an input optical signal pulse of an energy level less than the quasi-Fermi-level. Accordingly, if an input light (an assist light) of a wavelength longer than that of the input optical signal pulse is injected to the saturable absorption element, a stimulated emission occurs.

Figure 2B:
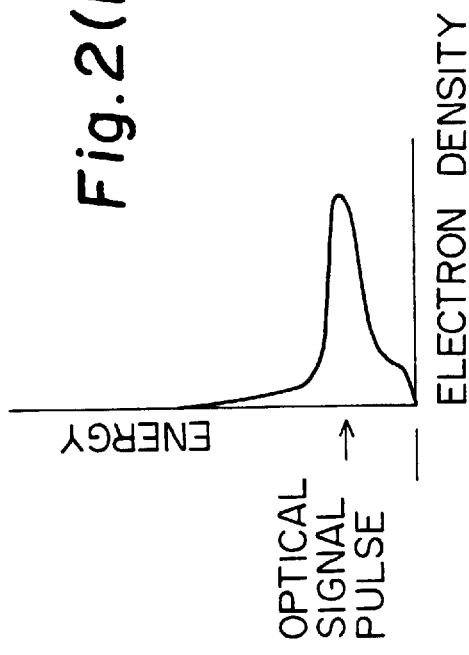
FIG. 2 is a time chart of an energy distribution of an electron at a conduction band in an absorbing layer of a saturable absorption element, to which the input optical signal pulse and the assist light are applied in accordance with the present invention.
Figure 2A:
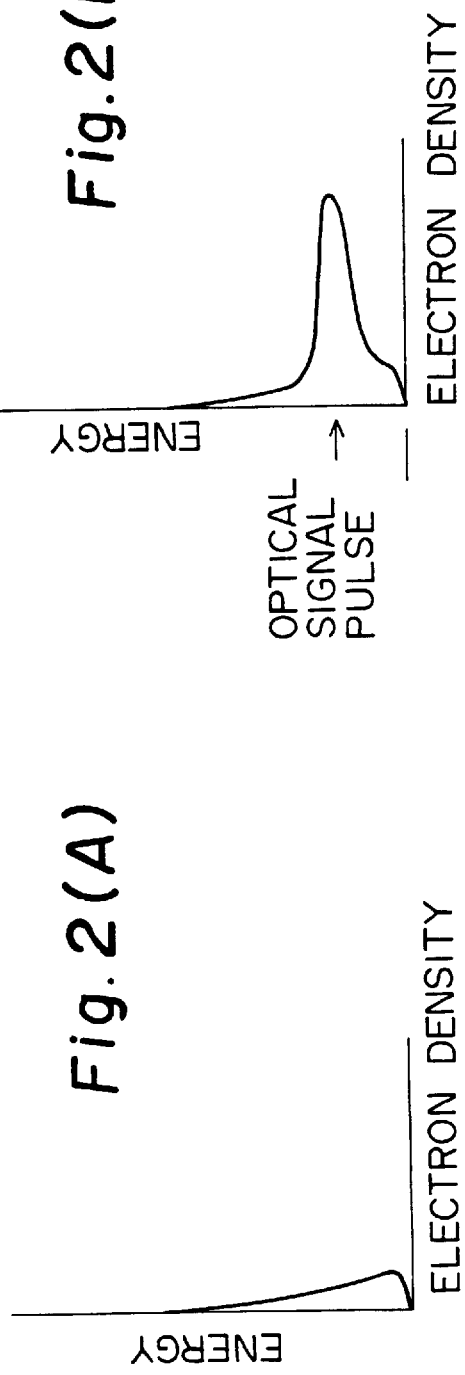
Figure 2D:
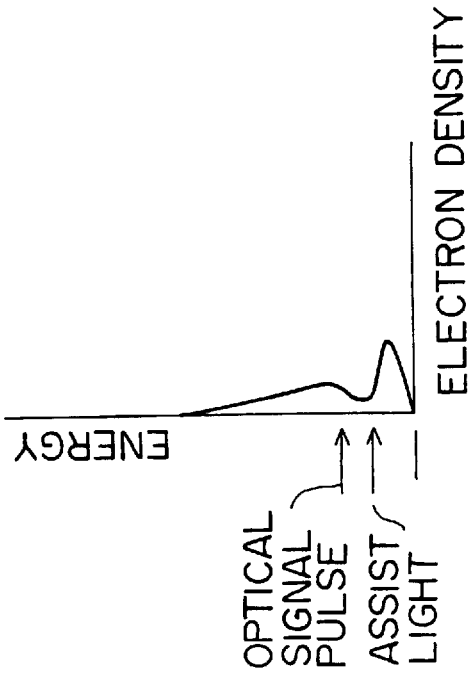
Figure 2C:
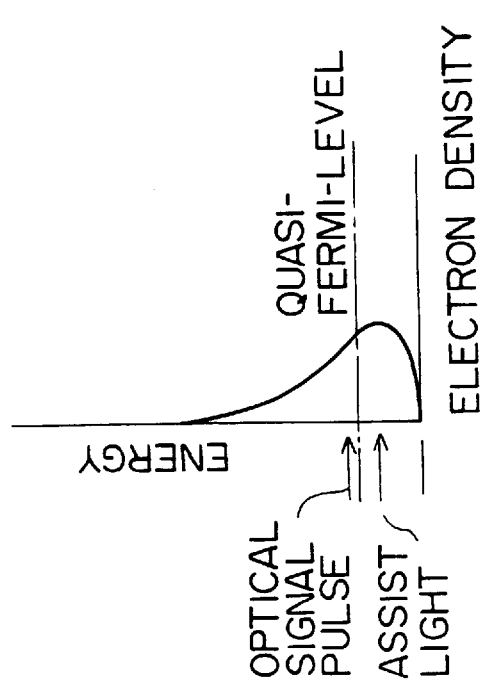
Figure 4B:
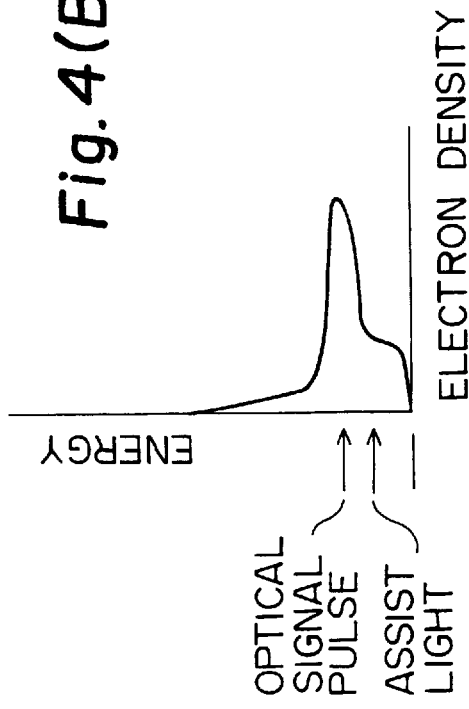
FIG. 4 shows schematic illustrations in a time series of energy distributions of electrons at a conduction band in an absorbing layer of a saturable absorption element, to which an input optical signal pulse and an assist light of continunous light wave are injected in accordance with the present invention.
Figure 4D:
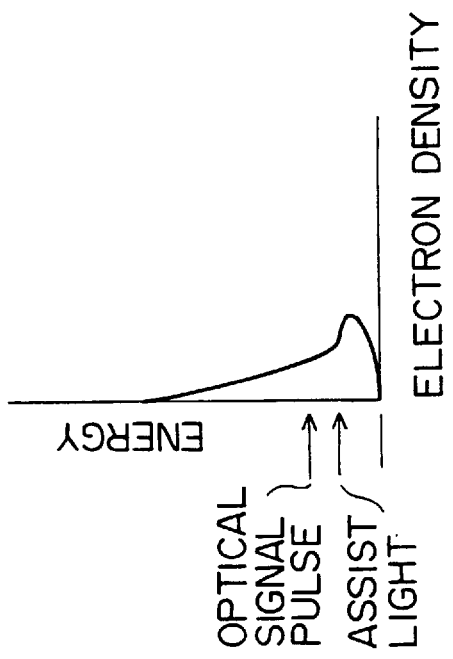
Figure 4A:
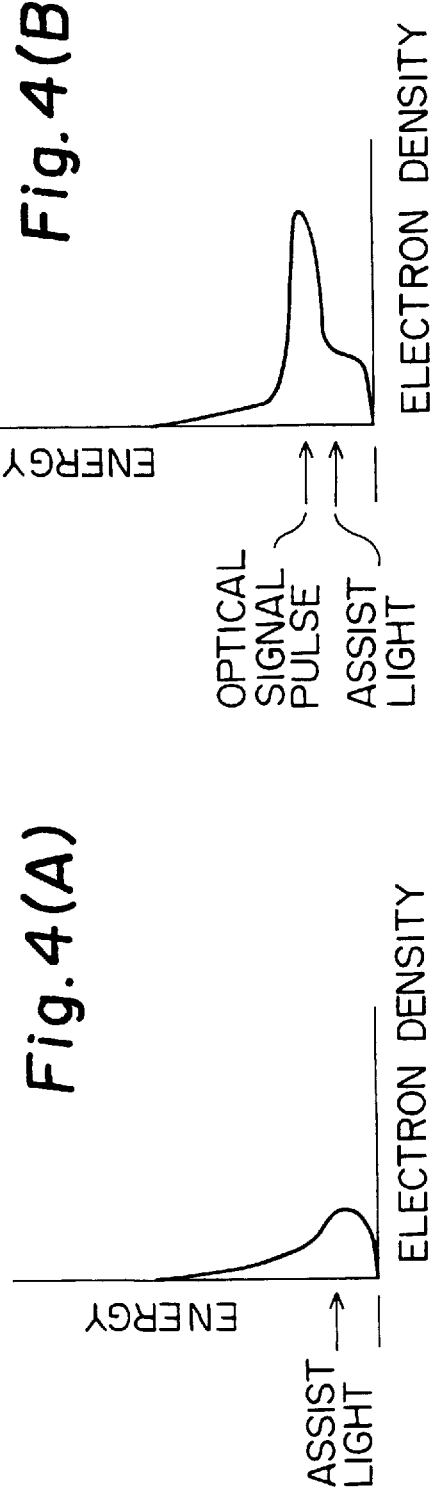
Figure 4C:
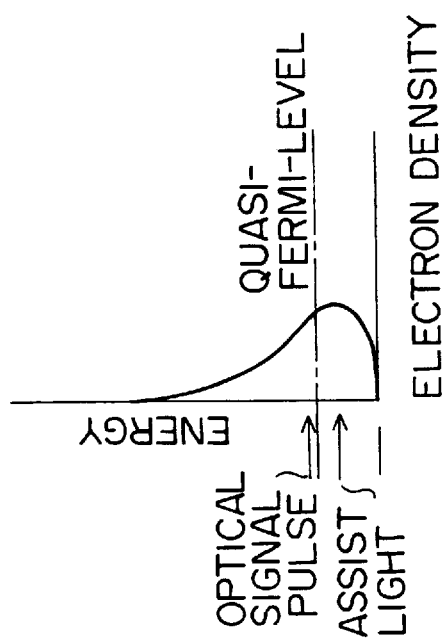

Since this decrease of carrier density caused by the stimulated emission has a response speed of 100 femto-second order, the carrier density decreases abruptly as shown in FIG. 2(D) and is abruptly recovered to the stationary distribution of thermal equillibrium [FIG. 2(A)] by an intra-band transition. As mentioned above, the saturable absorption element can perform "recover of absorption" at a response time of the stimulated emission and the intra-band relaxation.

As mentioned above, a time necesary to recover the original value of the absorption coefficient after once reaching a saturable absorption state is limited by a carrier life time in a conventional saturable absorption element but can be shortend to a time less than the carrier life time in accordance with the present invention. Accordingly, it can be effectively performed to reshaping of and eliminating noise from an optical short pulse of a pulse width of pico second order less than a carrier life time.

In the above description, the assist light is pulsively injected just after the input optical signal pulse to clearly describe the principle of the present invention and a difference between the present invention and prior art. However, a similar effect can be obtained in a case where an assist light of continuous wave is stationally injected. FIG. 3(A) illustrates a time chart of intensities of the input optical signal pulse and the assist light of continuous wave injected to a saturable absorption element and FIG. 3(B) illustrates a time chart of an absorption coefficient thereof.

In FIG. 4, energy distribution of electrons at a conductive band in an absorbing layer of a saturable absorption element of the present invention, to which an input optical signal pulse and an assist light of a continuous wave are injected, are schematically illustrated in a time series. In this case, the carrier density at the saturable absorption layer in case of a stationary state [FIG. 4(A)] increases in comparison with a state where no light is injected [FIG. 2(A)]. Since the energy of the assist light is smaller than that of the input optical signal pulse, little saturation of absorption is effected for the input optical signal pulse. Accordingly, the input optical signal pulse is absorbed as shown in FIGS. 4(B) and (C) at the injection of the input optical signal pulse, and the spectral hole barning is caused so that a similar operation as the case of no injection of the assist light is then carried out to relax to a distribution of thermal equillibrium state within a time of 100 femto-second order as a result of an intra-band transition. In this case, while a quasi-Fermi level raises over the energy level of the assist light, the carrier density is abruptly lowered as shown in FIG. 4(D) by a stimulated emission and then relaxed to a distribution of thermal equillibrium state [FIG. 4 (A)] as a result of an intra-band transition. This decrease of carrier density caused by the stimulated emission has a response speed of 100 femto-second order, so that the saturable absorption element can perform "recover of absorption" at a response time of the stimulated emission and the intra-band relaxation. A time chart of the absorption coefficient in the saturable absorption element in this case is illustrated in FIG. 3(B).

Figure 5A:
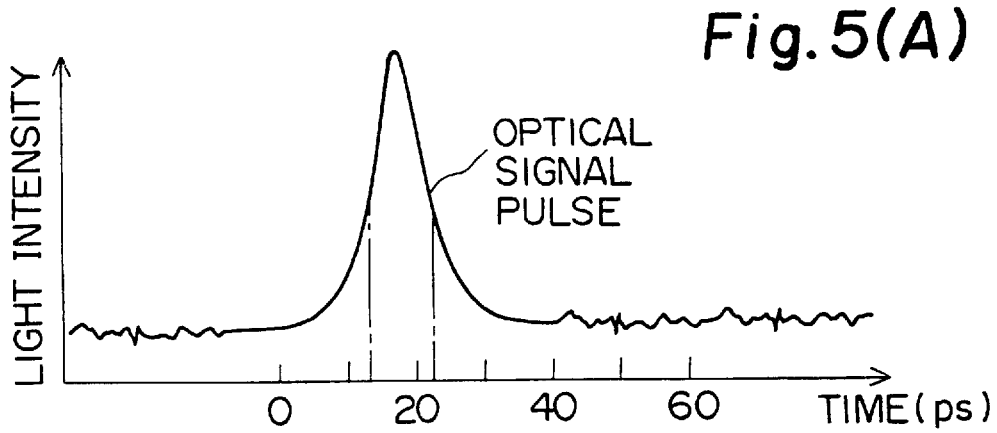
FIG. 5 shows schematic illustrations of an input optical signal pulse to which noise is superimposed, and of output optical signal pulses from a conventional saturable absorption element and from a saturable absorption element operating in accordance with the present invention.
Figure 5B:
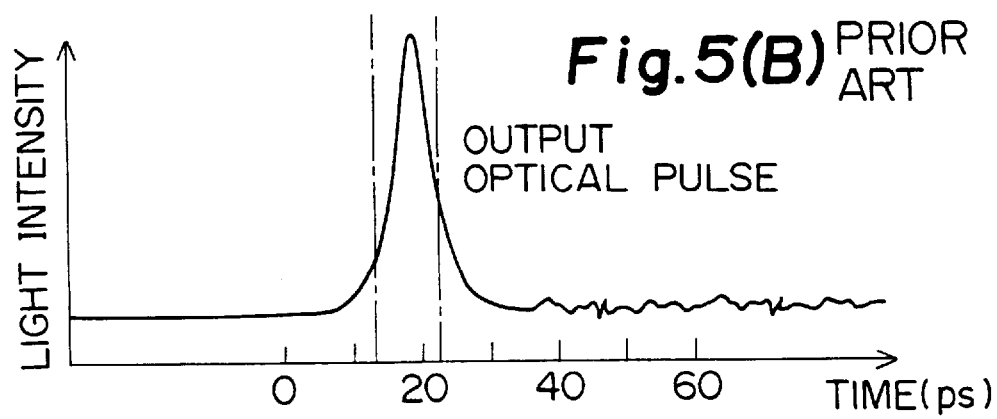
Figure 5C:
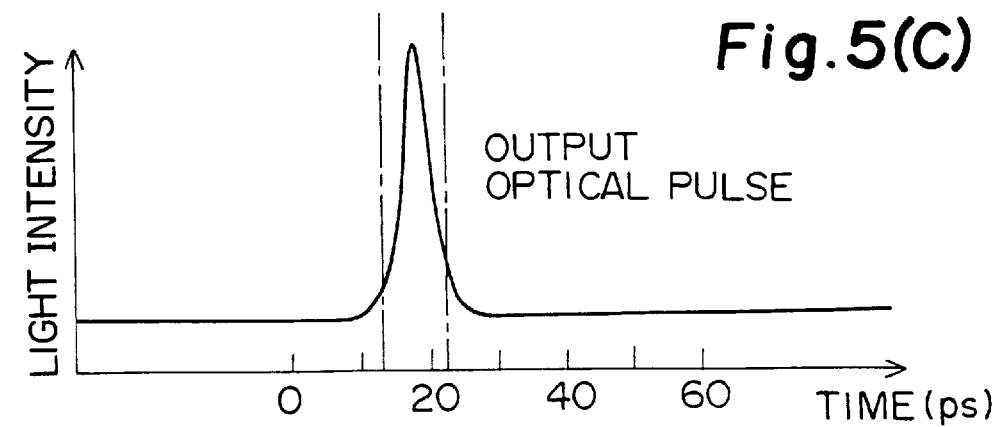

As mentioned above, it is possible in accordance with the present invention to effectively perform reshaping of and eliminating noise from an optical short pulse of a pulse width of pico second order less than a carrier life time. This operation is schematically illustrated in FIG. 5. In FIG. 5(A), a waveform of an actual input optical signal with noise is illustrated. In FIG. 5(B), a waveform of an output optical signal from a conventuional saturable absorption element is illustrated. In this case, noise before injection of the input optical pulse signal can be eliminated, while noise just after the input optical pulse signal cannot be eliminated because of non-recovery of the absorption coefficient. On the other hand, a waveform of an output optical signal from a saturable absorption element, to which an assist light is applied in accordance with the present invention, is illustrated in FIG. 5(C), where noise just before and after the input optical pulse signal is almost completely eliminated. Moreover, noise at the bottom portions of the input optical pulse signal is absorbed, while reshaping of the input optical pulse signal is almost completely performed.

The above is the principle and the operation of the present invention.

PREFERED EMBODIMENTS OF THE INVENTION

Embodiment 1

Figure 6:
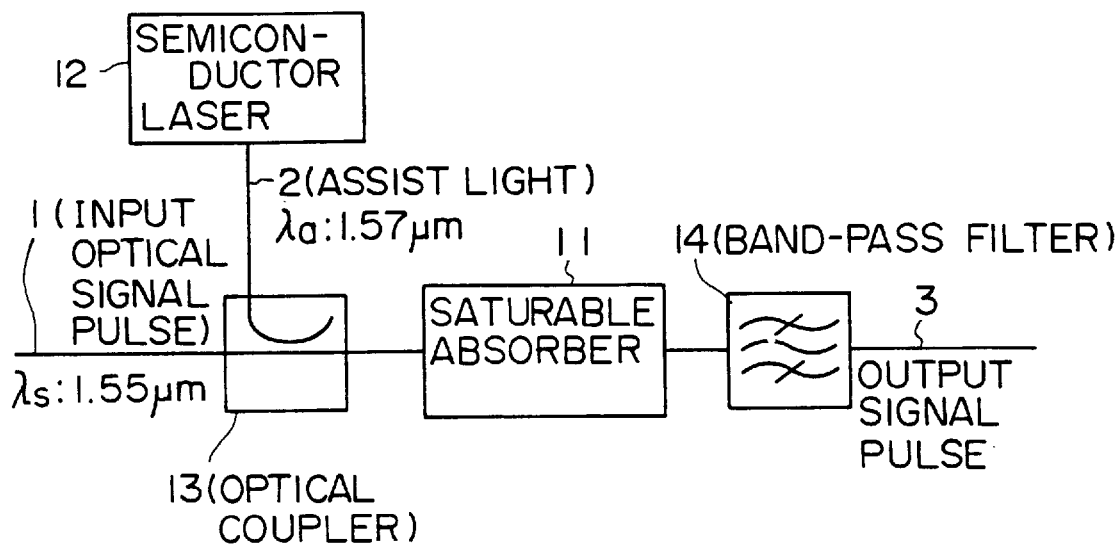
FIG. 6 is a block diagram illustrating a first embodiment of the present invention.

Embodiments of the present invention will be described below in details. FIG. 6 is a block diagram ilustrating an embodiment of a reshaping device for optical short pulses according to the present invention. To a saturable absorption element (saturable absorber) 11 of multiple-hetero structure, in which an absorption layer having a bandgap smaller than that of the enery level of the input optical pulse signal is sandwiched between semiconductor layers each having a bandgap larger than that of the absorption layer, an input optical pulse signal 1 and an assist light 2 generated from a semiconductor laser 12 are injected after combining at an optical coupler 13. The output optical signal from the sarurable absorption element 11 is filtered by a band-pass filter 14 through which only the input optical pulse signal passes to provide an output optical pulse signal 3. The optical pulse signal is an optical soliton wave of an average level of 0 dBm having a wavelength of 1.55 $\mu$m, a bit rate of 10 Gbps and a pulse width of 20 ps. In an actual application of an communication system, noise of a level of −15 dB with respect to a peak level of the input optical pulse signal is superimposed on the input optical pulse signal. The assist light, which is obtained by generating from the semiconductor laser 12 a continuous light wave (−7 dBm) of a wavelength 1.57 $\mu$m at a level less than the energy level of the input optical pulse signal by a level of 10 meV, is combined with the input optical pulse signal through an optical fiber and the optical coupler 13 to inject to the sarurable absorption element 11. The saturable absorption element 11 is a waveguide-type element, in which the absorption layer is provided by an InGaAs/InGaAsP layer 10 of multi-quantum-well having a bandgap of wavelength (1.58 $\mu$m) to have an element length of 200 $\mu$m, and an anti-reflection layer is coated on each of two end faces.

The absorption coefficient varied according to the passage of time in the saturable absorption element 11, to which the combined light is injected, will be described below. The passage of time is the same as shown in FIG. 3. At a state (A) before the input optical pulse signal 1 is injected, there is stationary absorption by the assist light 2, while noise of low level superimposed on the input optical pulse signal of a wavelength less than that of the assist light 2 is sufficiently absorbed in the saturable absorption element 11. This is a noise elimination operation. Next, at an instant when the input optical pulse signal 1 rises or builds up, the absorption coefficient of the saturable absorption element 11 is lowered, so that the input optical pulse signal 1 passes through the saturable absorption element 11, at a time (B) where the intensity of the input optical pulse signal increases. In this case, since the bottom of an optical pulse of low intensity is sufficiently absorbed in the saturable absorption element 11, the decreasing slope of the optical pulse passed therethrough is reshaped to be more sharp in comparison with that of the input optical pulse signal 1. This is a waveform reshaping operation. Next, at the time (C) just after a drop or decay of the optical pulse, the absorption coefficient of the saturable absorption element 11 is still lowered, so that the decaying portion of the input optical pulse signal 1 passes through the saturable absorption element 11. Thereafter, at a time (D), remaining carriers are abruptly decreased as a result of stimulated emission by the assist light 2, so that the absorption coefficient is recovered. As a result of the above operations, noise superimposed on the optical pulse signal is again absorbed. Since a combined output light of two wavelengths of the optical pulse signal 1 and the assist light 2 is output from the saturable absorption element 11, only the optical pulse signal is selected by the band-pass filter 14 to finally obtain an output optical pulse signal without including components of the assist light 2. Moreover, the noise level is of a level of −22 dB less than by 7 dB in comparison with that of the input optical pulse signal 1.

In accordance with the structure of the present invention, since the relaxation time of the absorption coefficient of the saturable absorption element 11 is of pico-second order, it is possible to effectively performing reshaping of and eliminating noise from an optical short pulse of a pulse width of pico second order.

Embodiment 2

Figure 7:
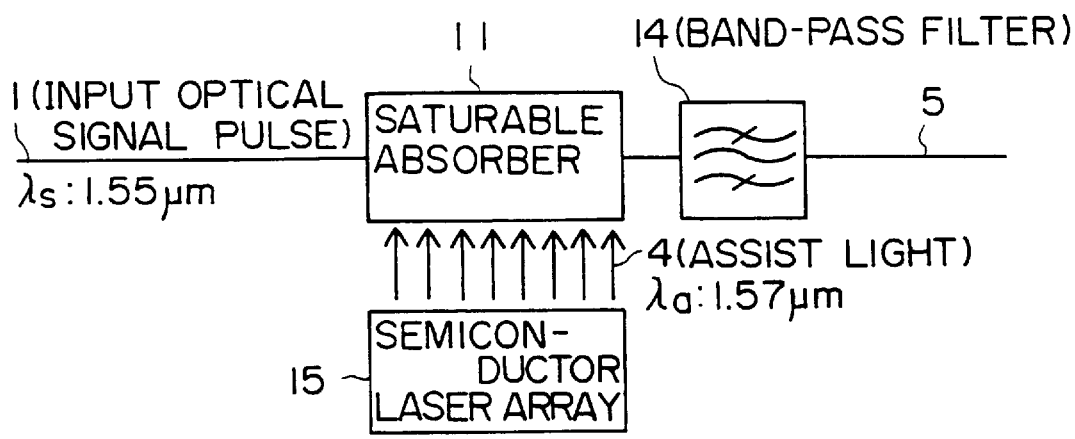
FIG. 7 is a block diagram illustrating a second embodiment of the present invention.

FIG. 7 is a block diagram ilustrating a second embodiment of a reshaping device for optical short pulses according to the present invention. This embodiment is the same as those of the embodiment 1 except an injection system of the assist light. In this embodiment 2, an assist light 4 is injected from a semidonductor laser array 15 of a wavelength of 1.57 $\mu$m to one side of an absorption layer of a saturable absorption element 11 after focusing by a lens 15. In this case, it is not necessary to combine the assist light 4 with the input optical pulse signal 1 as described in the embodiment 1. Other operations and merits of this embodiment 2 are the same as those of the embodiment 1.

Embodiment 3

Figure 8:
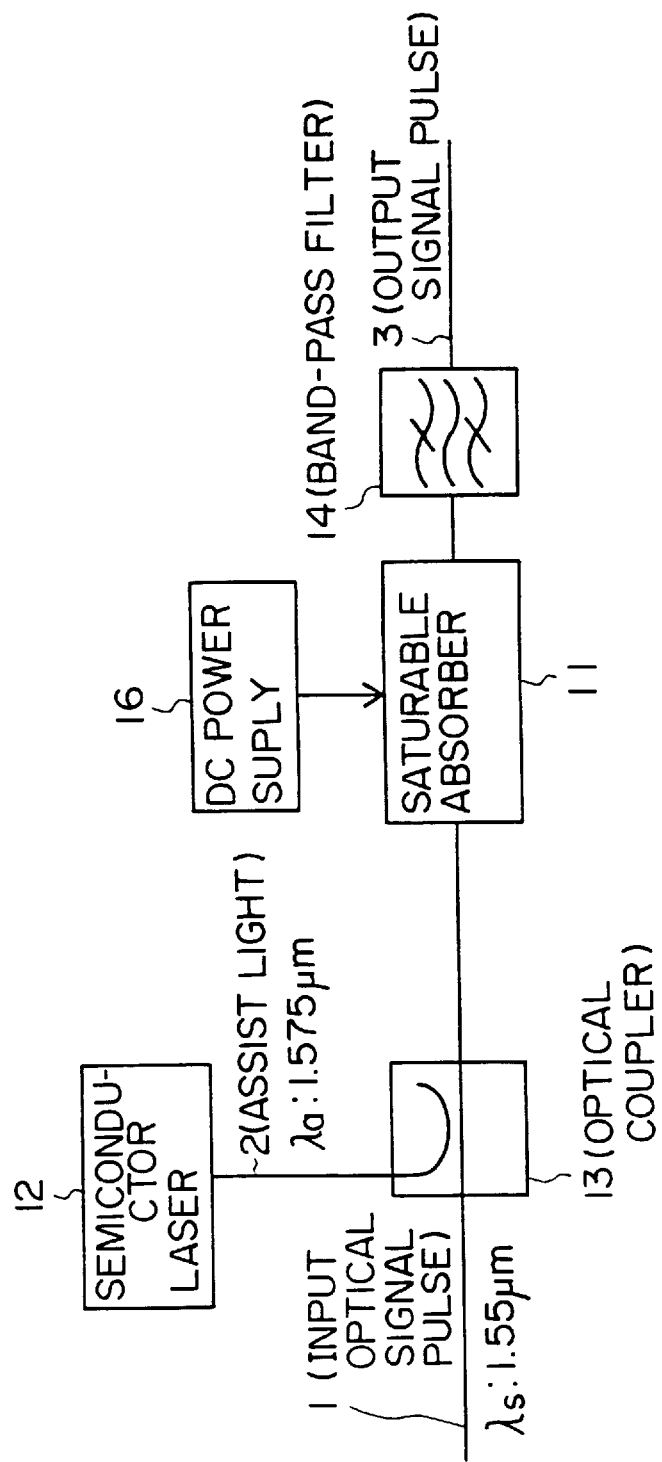
FIG. 8 is a block diagram illustrating a third embodiment of the present invention.

FIG. 8 is a block diagram ilustrating a third embodiment of a reshaping device for optical short pulses according to the present invention. This embodiment is the same as those of the embodiment 1 except that a direct current source 16 is connected to the saturable absorption element 11 to inject a direct current thereto.

In this embodiment 2, a direct current of 5 mA is injected to the saturable absorption element 11. Even when the input optical pulse signal 1 is not applied to the saturable absorption element 11, stimulated emission is generated for the assist light in response to the carrier increasing by the current injection, so that excess carriers produced by the absorption of the injected optical pulse signal 1 disappear more quickly by stimulated recombination in comparison with the first embodiment of no carrier injection.

In FIG. 9(B), a time chart of an absorption coefficient obtained at a pump-probe test using an optical pulse of 100 fs of a wavelength of 1.55 $\mu$m is illustrated. The wavelength of the assist light is of 1.575 $\mu$m. It will be seen that the absorption recovery time is less than 500 fs, which is limited by the resolution in the testing system.

Figure 10A:
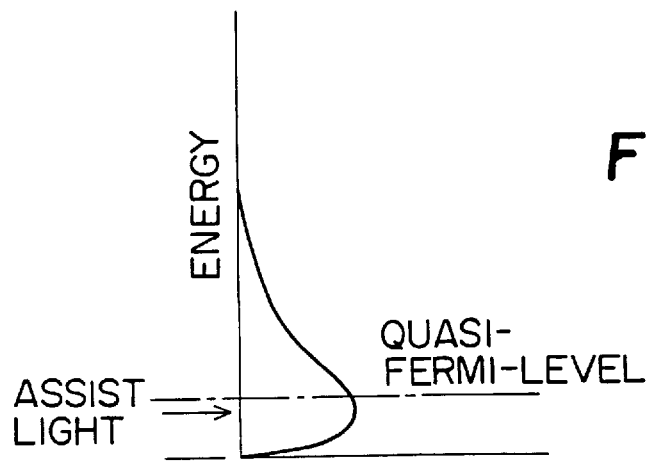
FIG. 10 illustrates time diagrams of electron distribution in a conduction band of an absorption layer in the embodiment shown in FIG. 8.
Figure 10B:
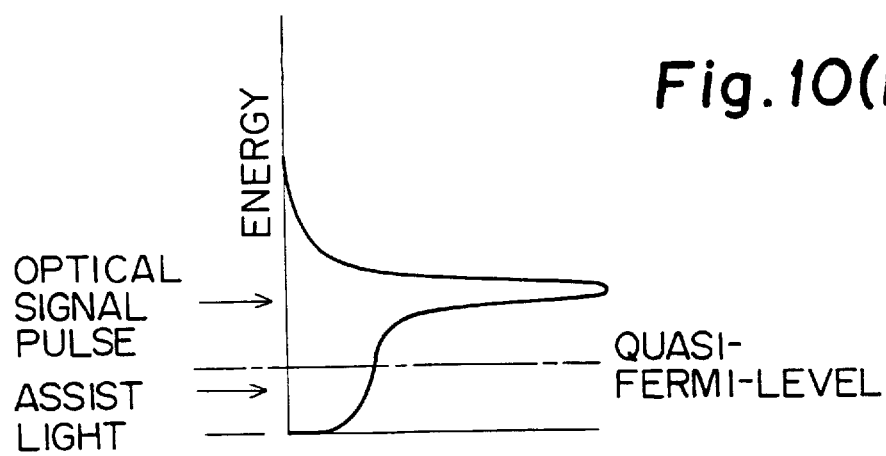
Figure 10C:
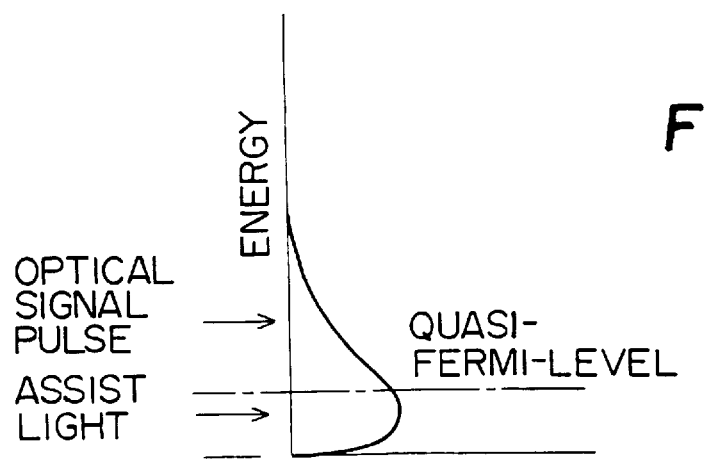
Figure 11:
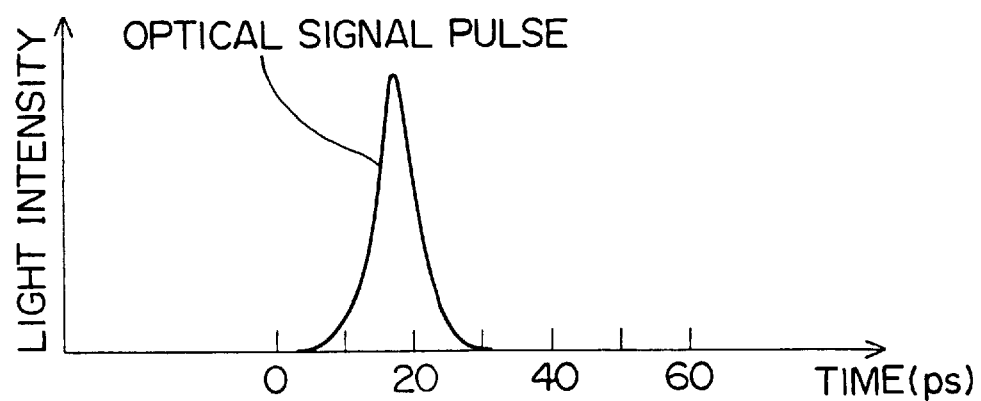
FIG. 11 illustrates a time chart (a) of an intensity of an input optical signal pulse injected to a conventional saturable absorption element and a time chart (b) of an absorption coefficient of the saturable absorption element.
Figure 11:
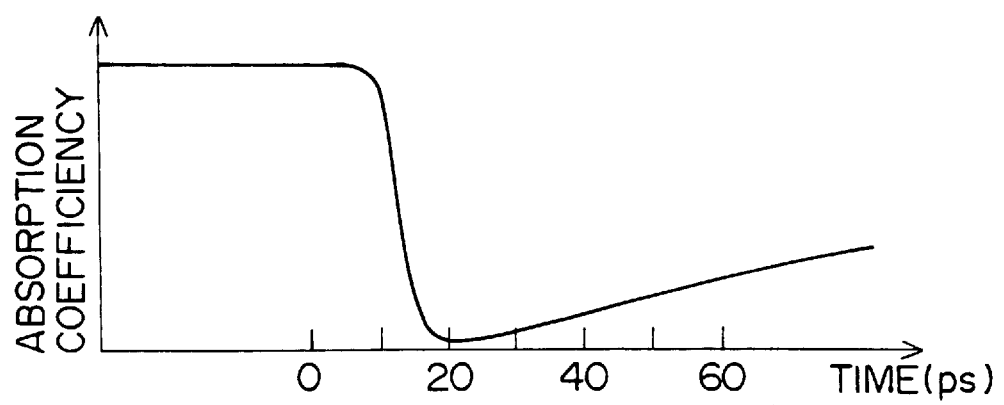

FIG. 10 illustrates time diagrams of electron distribution in a conduction band of an absorption layer of the saturable absorption element. As mentioned above, at a state (A) before injecting the input optical pulse signal 1, the quasi-Fermi level of the electrons and holes is raised in response to carriers increasing by current injection in the absorption layer of the saturable absorption element 11. Moreover, when the quasi-Fermi level is raised to a state where a difference between respective quasi-Fermi levels exceeds over the energy of the assist light 2, the stimulated emission is occured [FIG. 10(A)]. In this case, noise of a low level superimposed on the optical short pulse signal of a wavelength shorter than that of the assist light 2 is sufficiently absorbed by the saturable absorption element 11 as in the case of the embodiment 1. Next, when the light intensity becomes to be high (B) at the rising leading edge of the input optical pulse signal 1, the saturable absorption element 11 becomes a saturated absorption state, so that an optical pulse signal transmits therethrough as in the case of the embodiment 1. In this case, excess carriers produced by the input optical pulse signal are abruptly decreased in response to the stimulated emission of the assist light, which is a lower energy light in comparison with the input optical pulse signal, to recover the absorptance. It is different from the embodiment 1 that the absorption recovery time is a very short time less than several hundreds fs because of the steady occasion of the stimulated emission by the assist light.

In the above embodiment, although the absorption layer of the saturable absorption element is formed by a multi-quantum-well structure, the present invention is not limited by the structure of the saturable absorption element and can be applied to many sorts of saturable absorption elements. By way of example, the present invention can employ a saturable absorption element using an absorption layer of a multi-quantum-well structure of alternate laminating of quantum well layers of different thickness values, and a low dimension quantum structure, such as a quantum well wire and a quantum well box. Moreover, although a saturable absorption element of waveguide type is employed in the above embodiments, vertical cavity surface emitting type ones can be also employed.

Moreover, although an InGaAs/InGaAsP semiconductor of wavelength of 1.5 μm is employed as materials of the saturable absorption element, other III–V compound semiconductors and II–VI compound semidonductors may also be employed therefor. These semiconductor materials are not limited to lattice-matched materials and can include lattice-mismatched materials. The present invention can be applied to a wavelength region of 0.8 μm now widely developed for optical transmission or optical switching, etc. and other wavelength regions of 1.3 μm and 1.5 μm may be used if semiconductor absorption and amplification are available in the wavelength region.

Moreover, the wavelength of the assist light can be determined to be longer than that of the input optical pulse signal and that of light corresponding to the energy between respective quasi-Fermi-levels of electrons and holes, which are raised by electrones of a conduction band and holes of a valence band produced in the saturable absorption element in response to the assist light, and further shorter than that of an energy wavelength at a band edge defined by the bandgap.

Furthermore, the intensity of the assist light can be determined to have an intensity lower than respective quasi-Fermi-levels of excited electrons and holes in the saturable absorption element in response to the assist light.

The assist light described in the embodiment 2 can be injected independently from the input optical pulse signal or from the output side of the saturable absorption element or transversely.

As described above in details, a recovery time of an absorptance necessary to recover an original value after once becomming to a saturable absorption state was of 100 pico-second order limited by a carrier life time in conventional saturable absorption elements. However, the recovery time can be improved to be 100 femto-second order extremely shorter than the carrier life time in accordance with the present invention. Accordingly, since it is possible in accordance with the present invention to effectively perform reshaping of and eliminate noise from optical short pulses of a pulse width of pico second order, the present invention has great utility.

What we claim is:

1. A reshaping device for optical short pulses, comprising:
   a semiconductor saturable absorption element;
   first injection means for injecting first input optical signal pulses of optical short pulses to said saturable absorption element;
   second injection means for injecting, to said saturable absorption element, second input light of a wavelength longer than that of said first input optical signal pulses to accelerate, by stimulated emission, recombination of excited electrons and holes produced in said saturable absorption element in response to said first input optical signal pulses; and
   output means for selectively outputting said first input optical signal pulses of optical short pulses reshaped and noise-eliminated from said semiconductor saturable absorption element.

2. A reshaping device for optical short pulses according to claim 1, characterized in that said second input light comprises a continuous light wave.

3. A reshaping device for optical short pulses according to claim 1, characterized in that said second input light comprises optical pulses.

4. A reshaping device for optical short pulses according to claim 1, characterized in that a wavelength of said second input light is longer than that of said first input optical signal pulses, longer than that of light corresponding to an energy between respective quasi Fermi-levels of electrons and holes raised by electrons of a conduction band and holes of a valence band, which are produced in said semiconductor saturable absorption element in response to said first input optical signal pulses, and shorter than tat of an energy or a band edge determined by a bandgap.

5. A reshaping device for optical short pulses according to claim 1, characterized in that an intensity of said second input light is an intensity by which respective quasi Fermi-levels of excited electrons and holes produced in said semiconductor saturable absorption element in response to said first input optical signal pulses are lowered.

6. A reshaping device for optical short pulses according to claim 1, characterized in that said first injection means for injecting first input optical signal pulses and said second injection means for injecting second input light to said saturable absorption element are composed of an optical coupler, so that said first input optical signal pulses and said second input light are injected to said optical coupler and output light from said optical coupler is injected to said semiconductor saturable absorption element.

7. A reshaping device for optical short pulses according to claim 1, characterized in that said semiconductor saturable absorption element comprises a surface emitting semiconductor saturable absorptionn element, so that said first input optical signal pulses and said second input light are injected from two directions thereof.

8. A reshaping device for optical short pulses according to claim 1, characterized in that said output means for selectively outputting said first input optical signal pulses of optical short pulses reshaped and noise-eliminated from said semiconductor saturable absorption element comprises an optical fiber for separately deriving said first input optical signal pulses from said first input optical signal pulses and said second input light outputted from said semiconductor saturable absorption element.

9. A reshaping device for optical short pulses according to any one of claims 1 to 8, characterized in that means for injecting a direct current to said semiconductor saturable absorption element is further provided.

* * * * *